United States Patent
Dahl (10) Patent No.: US 12,492,681 B2
(45) Date of Patent: Dec. 9, 2025

(54) METHOD AND TOOL FOR DETECTING DEFECTS ON A WIND TURBINE GENERATOR BLADE

(71) Applicant: VESTAS WIND SYSTEMS A/S, Aarhus N (DK)

(72) Inventor: Henrik Boas Dahl, Esbjerg (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 129 days.

(21) Appl. No.: 18/249,526

(22) PCT Filed: Oct. 19, 2021

(86) PCT No.: PCT/DK2021/050312
§ 371 (c)(1),
(2) Date: Apr. 18, 2023

(87) PCT Pub. No.: WO2022/083838
PCT Pub. Date: Apr. 28, 2022

(65) Prior Publication Data
US 2023/0392585 A1 Dec. 7, 2023

(30) Foreign Application Priority Data
Oct. 19, 2020 (EP) .................................. 20202527

(51) Int. Cl.
*F03D 17/00* (2016.01)
*G01N 19/08* (2006.01)

(52) U.S. Cl.
CPC ......... *F03D 17/013* (2023.08); *F03D 17/028* (2023.08); *G01N 19/08* (2013.01); *F05B 2260/83* (2013.01)

(58) Field of Classification Search
None
See application file for complete search history.

(56) References Cited

U.S. PATENT DOCUMENTS

| | | | |
|---|---|---|---|
| 8,347,746 B2 * | 1/2013 | Hafenrichter | G01M 5/0016 73/866.5 |
| 2018/0328721 A1 * | 11/2018 | Hatcher, Jr. | F01D 25/24 |
| 2020/0025176 A1 | 1/2020 | Georgeson et al. | |

FOREIGN PATENT DOCUMENTS

| | | |
|---|---|---|
| CN | 106645570 A | 5/2017 |
| CN | 107014902 A | 8/2017 |

(Continued)

OTHER PUBLICATIONS

International Search Report and Written Opinion for PCT Application No. PCT/DK2021/050312, mailed Jan. 5, 2022.

(Continued)

*Primary Examiner* — Suman K Nath
(74) *Attorney, Agent, or Firm* — Patterson + Sheridan, LLP; Gero G. McClellan (57) ABSTRACT

In order to provide an improved and cost-efficient method and tool for performing a defect detection procedure aiming at the detection of a defect underneath an outer protection layer covering the leading edge of a wind turbine generator blade a method is described during which a tool tip is being biased against the surface of the outer protection layer while being guided over the outer protection layer and deviations in the uniformity of the at least one feedback value are sensed to identify potential defects. A tool and a detection unit suitable for the described method is also described.

17 Claims, 4 Drawing Sheets

(56) References Cited

FOREIGN PATENT DOCUMENTS

| | | | |
|---|---|---|---|
| CN | 108614034 | A | 10/2018 |
| CN | 108732250 | A | 11/2018 |
| CN | 110735768 | A | 1/2020 |
| WO | 9321523 | A1 | 10/1993 |
| WO | 2018/174372 | A1 | 9/2018 |

OTHER PUBLICATIONS

Chia Chen Ciang et al: "Structural health monitoring for a wind turbine system: a review of damage detection methods", Measurement Science and Technology, IOP, Bristol, GB, vol. 19, No. 12, Dec. 1, 2008 (Dec. 1, 2008), p. 122001, XP020144300, ISSN: 0957-0233, DOI: 10.1088/0957-0233/19/12/122001.

Extended European Search Report for European Patent Application No. 20202527.6-1007, dated Apr. 20, 2021.

Office Action received for CN Patent Application No. 202180080695.7, mailed on Jun. 12, 2025, 16 pages (7 pages of English Translation and 9 pages of Original Document).

* cited by examiner

METHOD AND TOOL FOR DETECTING DEFECTS ON A WIND TURBINE GENERATOR BLADE

The invention relates to a method and to a tool for detecting defects underneath an outer protection layer protecting the leading edge of a wind turbine generator blade as well as to a detection unit making use of such a method and such a tool.

When a wind turbine is rotating, the leading edge of a wind turbine generator blade is cutting through the air surrounding it at very high speed with the speed being highest at the blade's outer tip. Collisions with airborne particles such as rain drops, hale, sleet, dust, leaves, bugs and the like are unavoidable over time. Also, varying weather conditions with changing temperatures, humidity, wind speeds and UV ray exposition may stress the blade material in the long term. In order to protect the actual structural material of a blade which is giving the blade its structural strength (typically a fiber composite material) it is known in the art to provide the leading edge of a wind turbine generator blade with a protection layer which covers at least a part of the leading edge along its length, potentially from near the base of the blade close to the center of rotation all the way up to the blade's tip. Such a protection layer serves as erosion shield and may be provided in the form of a U-shaped profile or in the form of a sheet or strip and will be attached or bonded, preferably glued, to the structural material of the blade typically as one of the final steps of blade production or as part of a blade repair process. Such a material layer may be attached or bonded to the structural material of the blade in one piece or in several neighboring segments. The material used for the protection layer may for example be a polyurethane material of high durability and high resilience against impact such as thermoplastic polyurethane (TPU). Other materials feasible for the intended purpose may of course also be used. Prior art documents WO 2018/114123 A1 and WO 2016/075619 A1 mention such a protective material layer and also the invention described in this application may make use of such a material.

Laid open patent application document WO 2018/114123 A1 emphasizes the importance of a correct and continuously intact bonding between the structural material of a blade and the protective material layer used as a protective cover or erosion shield and describes a method to avoid pockets of air (so called "voids") underneath the protective material layer by extracting air through an air exit channel which is provided during the bonding process in between the wind turbine generator blade and the protective layer. In the area of an existing air pocket or void the bonding between the protection layer and the structural material is incomplete such that a void can lead to delamination, for example due to the notch effect at the defective bonding point. The method described in WO 2018/114123 A1 can help to minimize the existence of voids but will not fully eliminate them. Furthermore, the method does not provide a solution for the problem that even after conducting the suggested method a final quality control step needs to be performed in order to ensure that in fact no voids of relevant size are present.

Furthermore, from prior art documents EP 2 275 670 A2, CA 3 015 284, US 2010/0208247 A1 and EP 3 453 874 A1 methods and apparatuses are known serving to inspect wind turbine generator blades in order to detect and identify potential material defects, partially including material defects lying underneath an outer surface of the blade. Some of these methods and apparatuses may be applied as one of the final steps during the blade production process at the production site, or they may be applied after final installation of the wind turbine or even for inspections after a period of use at the wind turbine site. These methods and apparatuses do, however, require a very special and technically highly sophisticated equipment and/or are partially not feasible to be used in a quick and uncomplicated manner during production of a wind turbine generator blade just prior to a blade's completion and transport to the wind turbine site. In addition, the methods and apparatuses known in the art may not have the ability to detect potential defects underneath a slightly thicker material layer such as a protective layer of for example a thermoplastic polyurethane as described above.

It is therefore one object of the present invention to provide a method and a tool for detecting potential defects underneath an outer protection layer protecting the leading edge of a wind turbine generator blade which is capable of detecting a potential pocket of air or void as one of the final production steps in a simple, quick and easy to use manner. It is a further object of the invention to make available such method and such a tool that does not require highly sophisticated technical equipment.

To meet these objects, the invention provides for a method for detecting defects underneath an outer protection layer protecting the leading edge of a wind turbine generator blade, wherein the method includes the steps of guiding a defect detection tool over the outer protection layer in a tool movement direction, and sensing at least one feedback value the tool experiences while being guided over the outer protection layer in order to detect a potential defect, wherein the defect detection tool comprises a tool base (12) and a tool tip is being biased against the surface of the outer protection layer in a tool biasing direction while being guided over the outer protection layer in the tool movement direction and detecting potential defects underneath the outer protection layer as deviations in the uniformity of the at least one feedback value, and wherein the tool tip being formed by a disc, a rim or a ball rotatably supported in relation to the tool base such that when the defect detection tool is being guided over the outer protection layer in the tool movement direction and biased in a tool biasing direction against the surface of the outer protection layer then the tool tip rolls on the surface of the outer protection layer. This allows for moving of the tool along the surface of the outer protection layer tool and sensing the response to the biasing with no lateral movement between the tool tip and the outer protective layer in the measurement point between the tool tip and the outer protective layer, which increases the sensitivity of the measurement dramatically.

To meet these objects, the invention further provides for a tool for detecting defects underneath an outer protection layer protecting the leading edge of a wind turbine generator blade, the defect detection tool comprising a tool base and a tool tip, the tool tip being designed to be guided across the surface of the outer protection layer in a tool movement direction and to be biased against the surface of the outer protection layer in a tool biasing direction in order to sense at least one feedback value the tool tip experiences in tool movement direction and/or in tool biasing direction while being guided over the outer protection layer, wherein the tool tip is formed by a rim or disc rotatably supported in relation to the tool base.

The invention also provides for a detection unit for detecting defects underneath an outer protection layer protecting the leading edge of a wind turbine generator blade making use of at least one defect detection tool as mentioned above and/or being used in a method as mentioned above.

The invention provides a method and a tool which by biasing the tool tip against the surface of the outer protection layer and at the same time moving the tool along a tool movement path along the leading edge in tool movement direction the feedback the tool experiences whilst being in contact with and rolling on the surface of the outer protection layer can be sensed. Any notable change in the uniformity of the sensed feedback can be considered a potential defect underneath the outer protection layer since in case of a perfectly evenly and continuously bonded outer protection layer and in absence of any defects the feedback or the "feel" of the tool being biased against and moved along the surface of the protective layer would be consistent. Particularly, in case the tool is moved across an air pocket or void that is present underneath the outer protection layer the tool tip being in contact with, biased against and rolling on the surface of the outer protection layer would—due to the sufficiently soft material properties of the material used for the protection layer, e.g. TPU as mentioned above—sink into the void to at least some extent when reaching a first edge of the void and would rise out of the void when getting into contact with a second edge of the void just prior to leaving the area underneath which the void is present since the void is softer that the adhesive normally being present between the outer protective layer and the blade. It should be observed that the present method and tool utilizing a tool tip, which is rotatable supported by the tool base allows for sensing the response to mechanical force applied to the outer protection layer by the tool and particularly changes in response under lateral movement with no lateral movement between the tool tip and the outer protection layer in the measurement point which allows for precise observation of the response during movement of the tool tip over the surface. A further consequence of this is that the measurement typically may be conducted under dry conditions i.e. without supplying of lubricant, vacuum gel or similar added substance, which reduces the cost, the environmental impact and the time for post treatment (clean up) after the use of the tool or method according to the invention.

In this context it is noted that the tool and the method are particularly directed to detecting defects and air pockets or voids in a bonding layer underneath the outer protective layer. The bonding layer will typically comprise or even be solely consistent of the adhesive being used to bond the outer protection layer to the structural material of the wind turbine generator blade and will typically be positioned between an inner surface of the protective layer and an outer surface of the blade's structural material.

For investigation of the leading edge of the wind turbine generator blade the tool or a detection unit comprising a such a tool will preferably be moved in longitudinal direction of the blade such that the tool movement direction is preferably a direction substantially parallel to the course of the leading edge of the blade. However and in particular, if the defect detection tool is designed as a tool to be used manually by a user as described further below the tool movement direction may of course be any direction along which the user decides to guide the tool on the surface of the protection layer. Being able to freely move the tool back and forth by hand will enable the user not only to detect the existence of a potential defect or void (or to verify a result obtained by using a for example automated detection unit), but will also enable the user to identify the dimensions of a potential defect or void and allow for precise repair measures.

One of several advantages of the described method is that the method the defect detection tool may be designed as a hand-held tool and may be hand-guided by a user so that the at least one feedback value can be sensed by the user, e.g. a worker at the production site who quickly wants to control correct bonding of the protection layer to the structural material of the blade and/or who wants to find out not only about the length of a detected void in longitudinal direction of the blade but also about the width of a void in a direction substantially perpendicular to the longitudinal direction. For this purpose, the defect detection tool may be provided with a handle to be held by the hand of the user such that the user will easily "feel" a void underneath the protection layer by the feedback the tool gives the user during its use. Via the handle the user can easily apply pressure on the tool by hand as needed to detect any voids underneath the protection layer.

Alternatively, the tool base may be part of or may be connected to a sensing section that again is part of a sensing unit sensing the deviation in the uniformity of the at least one feedback value with at least one sensor. The defect detection tool is then part of a detection unit that is moved along the leading edge of the wind turbine generator blade, the detection unit comprising such a feedback value sensing unit which is sensing the deviation in the uniformity of the at least one feedback value with the at least one sensor. The at least one sensor preferably is one of a displacement measuring sensor and a pressure measuring sensor and a force measuring sensor. The feedback value to be sensed can therefore preferably be a displacement the tool tip experience in relation to the sensing section as a result of sinking in into or rising out of a void, or can be a change in a pressure or force exerted onto the tool tip during movement on the surface of the protection layer, such that the feedback value could also be described as a resistance value.

In order to allow easy use of the tool or any detection unit provided with such a tool the rim, disc or ball forming the tool tip may be supported in relation to the tool base by rolling elements arranged between the tool tip and the tool base. In a preferred and very easy to realize embodiment the tool tip may be the outer rim of a roller bearing. Roller bearings are particularly useful in keeping a linear direction of the tool movement during use of the tool. In another preferred embodiment, the tool tip may be the ball of a ball transfer unit. A ball transfer unit is an omnidirectional load-bearing spherical balls mounted inside a restraining fixture and may also be referred to as roller ball transfer bearing or simply a ball roller. Ball transfer units are particularly useful in allowing for easy movement of the tool in all directions such as in circles or spirals during use of the tool.

The tool tip may have many sizes dependent on the used material properties of the outer protective layer and the force that the user or tool is able to apply to the tool. However, when the method and tool is used for examining outer protective layers of TPU, then it was found to be highly advantageous that, the width of the tool tip perpendicular to the tool movement direction is less than 10 mm, more preferably equal to or less than 6 mm. Preferably the width of the tool tip perpendicular to the tool movement direction is at least 4 mm. Furthermore, the outer diameter of the rim or disc forming the tool tip may be less than 25 mm, preferably equal to or less than 20 mm. Preferably the outer diameter of the rim or disc forming the tool tip is preferably at least 15 mm. Then the tool tip is a ball, then it is preferred that the diameter of the ball is between 6-20 mm. These preferred sizes allowed for reducing the contact surface the tool tip has during use with the surface of the protection layer so as to allow the tool tip to expose a sufficiently higher pressure and to more easily sink into a void underneath the protection layer without destroying the protective layer or the adhesive layer beneath it. Furthermore, it provided for a more precise measurement with regard to the size and position of potential defects under the outer protective layer.

To increase the potential feedback value the defect detection tool is capable to give the tool tip is preferably rigidly supported in relation to the tool base in tool biasing direction. Rigidly supported shall mean that between the tool tip and the tool base serving to pass on or transmit the feedback value to the user or a sensor of a sensing unit no dampening elements are provided.

It should be noted that if a defect detection tool as mentioned above is used as part of a sensor equipped a detection unit such a detection unit may make use of a plurality of such defect detection tools and may include a plurality of sensors in order to cover several paths in tool movement direction which will cover a wider area during a single "run" of the detection unit along the leading edge.

For biasing the tool tip against the surface of the protection layer the detection unit may be positioned on the wind turbine generator blade leading edge with tool tip being biased against the surface of the outer protection layer by the weight of the detection unit including any external weights the detection unit may be weighted with. The use of external weights acting on the tool tip via the detection unit may be advantageous also because external weights can help to lower the center of gravity of the detection unit placed on the leading edge so that the detection unit will be in a statically stable position when being moved along the leading edge of the blade. Alternatively or in addition to any external weights added to the detection unit, it is of course possible that the user applies pressure to the detection unit.

As mentioned above, the tool comprises a tool base and a tool tip with the tool tip for example being formed by a disc or rim rotatably supported in relation to the tool base such that when the defect detection tool is being guided over the outer protection layer in the tool movement direction and biased in a tool biasing direction against the surface of the outer protection layer the tool tip rolls on the surface of the outer protection layer. Particularly if one or a plurality of defect detection tools are part of a defect detection unit the tool tips may serve as wheels of the detection unit.

Preferably, when the detection unit is moved along the leading edge of the wind turbine generator blade the coordinates of a detected potential defect may be stored in a storing unit and/or a detected potential defect may be marked on the wind turbine blade by a defect marking device and/or a detected potential defect is signaled to a user by a signal unit. For example, the detection unit may comprise a control wheel of known diameter rolling on the outer protection layer or another surface of the blade and by registering the wheel rotations and by storing the corresponding distance in the storing data can be generated showing to the user at what positions of the covered distance potential defects have been registered. Alternatively or in addition, a marking device such as a paint spraying device may be activated when a potential defect is detected for marking on the surface the point or area where the defect has been detected. Furthermore, and also alternatively or in addition a signal unit may for example emit a sound, a light signal or any other appropriate signal at the moment when a potential defect is detected. This will enable the user in an easy manner to manually control and verify points or areas with potential detected defects manually with an the manually operated tool as mentioned above after having used more automated functioning detection unit in a first step.

Various additional features and advantages of the invention will become more apparent to those of ordinary skill in art upon review of the following detailed description of one or mor illustrative embodiments taken in conjunction with the accompanying drawings. The accompanying drawings, which are incorporated in and constitute a part of this specification, illustrate one or more embodiments of the invention and, together with the general description given above and the detailed description given below, serve to explain the one or more embodiments of the invention. In the accompanying drawings

Figure 1:
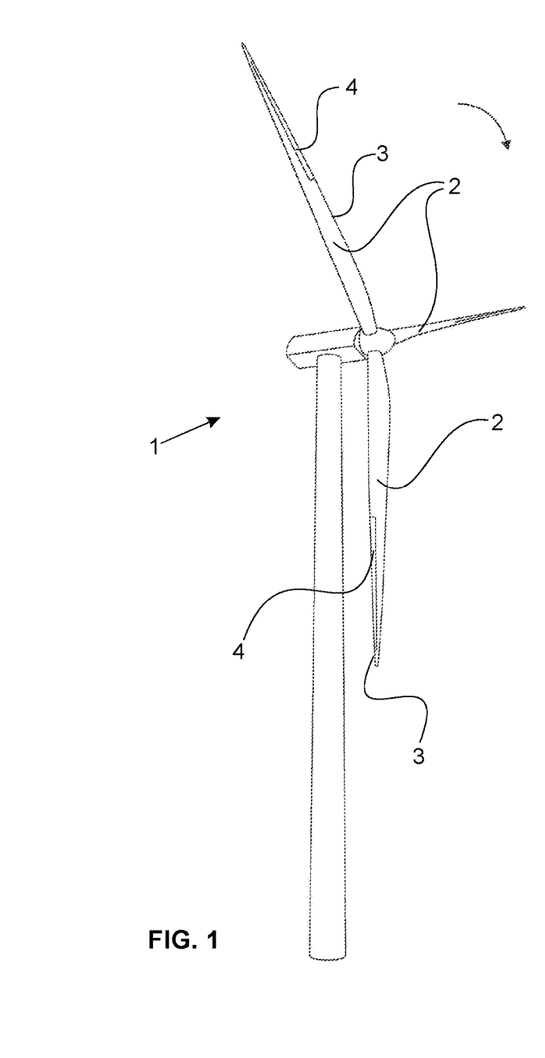
FIG. 1 is a schematic perspective view of a horizontal axis wind turbine.

FIG. 1 shows a horizontal axis wind turbine 1 with three blades 2 rotating in the direction indicated by the arrow. The blades 2 have a leading edge 3. In the fast-rotating outer region of the leading edge an outer protection layer 4 serving as erosion shield is attached.

Figure 2:
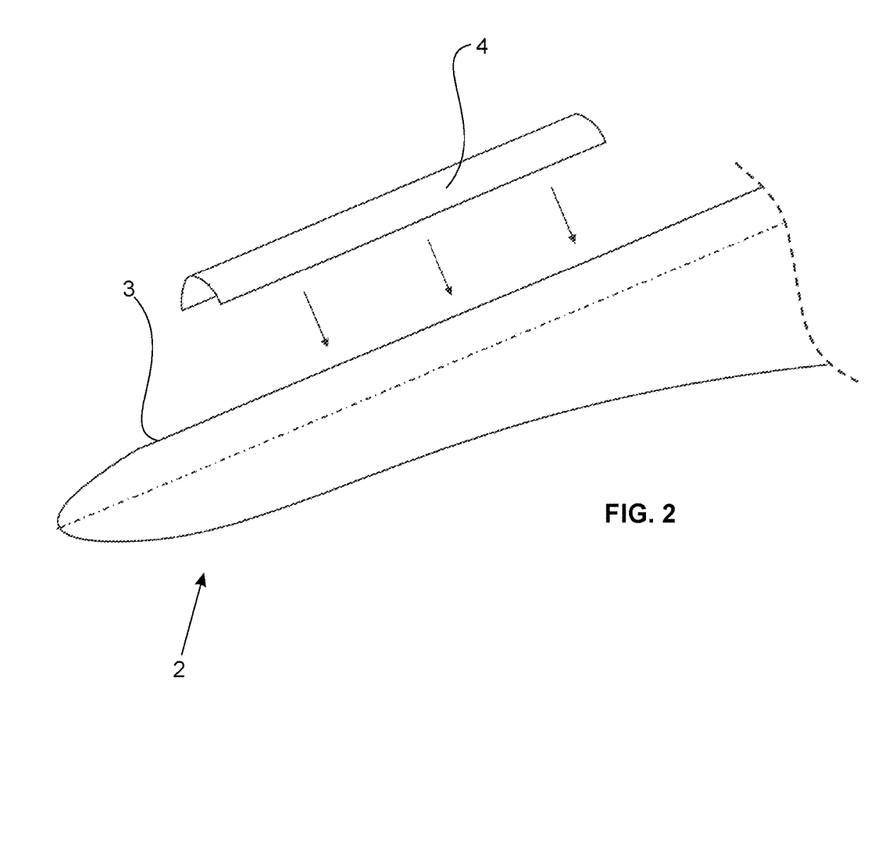
FIG. 2 is a schematic perspective view of a section of a wind turbine generator blade and a protective layer to be bonded to the leading edge of the blade.

FIG. 2 shows a portion of a wind turbine generator blade 2 and an outer protection layer profile 4 prior to being bonded to the blade's leading edge 3.

For sake of completeness, it should be mentioned that the outer protection layer may—other than depicted in FIG. 1 and FIG. 2—extend in longitudinal direction further along the leading edge of the blade, for example (almost) all the way to the blades' outer tip and/or (almost) all the way to the base of the blade with which it is mounted to the hub.

Figure 3:
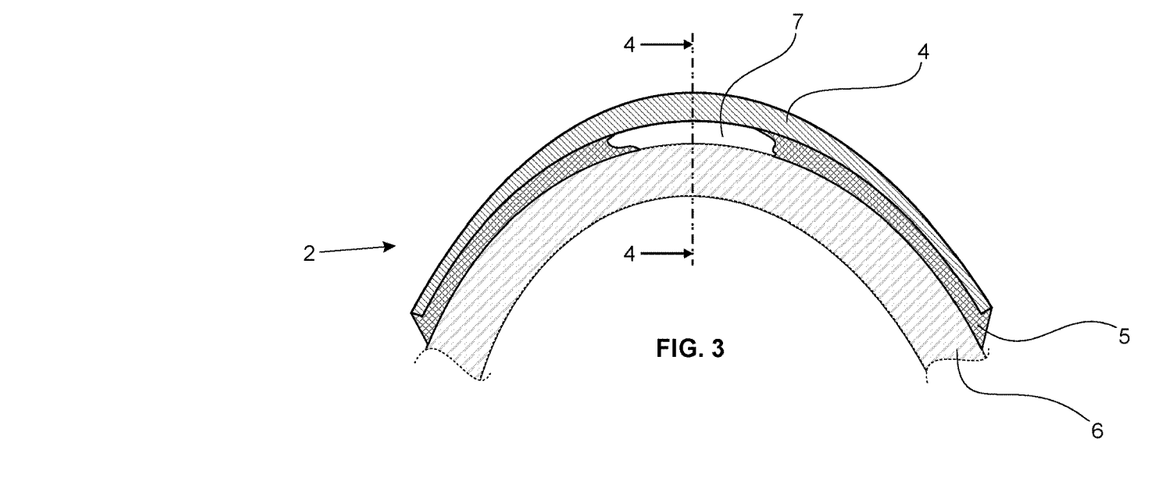
FIG. 3 is a first schematic view of a partial cross section of the wind turbine generator blade.
Figure 4:
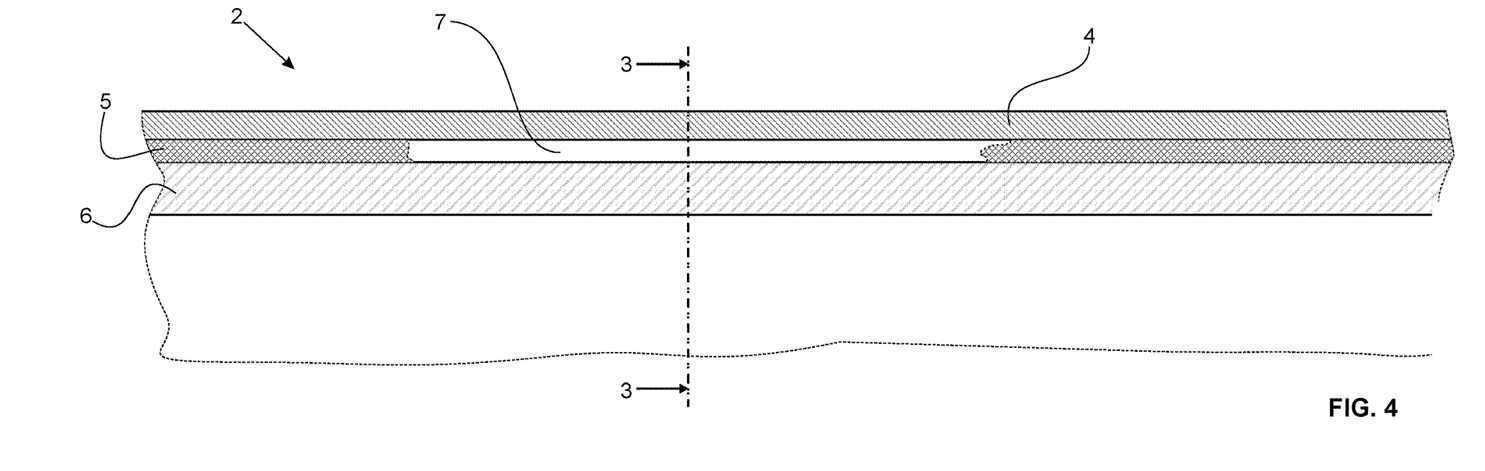
FIG. 4 is a second schematic view of a partial cross section of the wind turbine generator blade, FIG. 5 show views of defect detection tools.

FIG. 3 and FIG. 4 are schematic cross-sectional views of a leading-edge region of a wind turbine generator blade in which an outer protection layer is present (FIG. 3: transverse to the longitudinal direction of the blade 2/FIG. 4: in longitudinal direction of the blade 2). The leading edge is of a layered construction and comprises a structural material layer 6 for giving the blade its structural strength (typically consisting of fiber composite material), the already mentioned outer protection layer 4 (serving as an erosion shield) and a bonding layer 5 (typically consisting mostly or solely of an adhesive used to bond the protection layer 4 to the structural material layer 6).

The outer protection layer 4 is preferably made of an erosion resistant and impact resilient plastic material such as for example polyurethane based plastics, e.g. TPU. The thickness of the protection layer may be thickest in the middle region and decrease to the side edges to enhance aerodynamic performance and can be from about 4 mm in the middle region to just 0.1 mm thick at the side edges. The thickness of the outer protection layer is typically substantially constant in the longitudinal direction of the blade.

FIG. 3 and FIG. 4 illustrate a void 7 formed by an air pocket in the bonding layer 5. In the area of the void the outer protection layer 4 does not adhere directly to the inner structural material layer 6. From this area delamination may develop over time such that the potentially achievable lifespan of the outer protective layer and effectively the blade will be reduced.

Figure 5A:
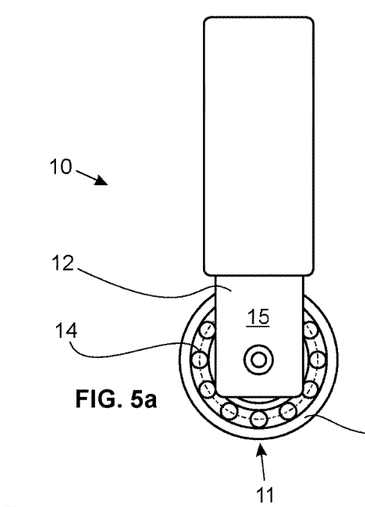
Figure 5B:
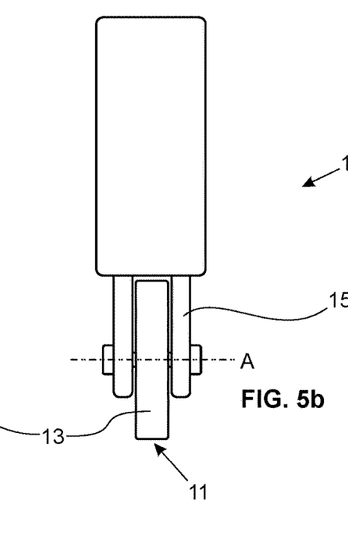
Figure 5C:
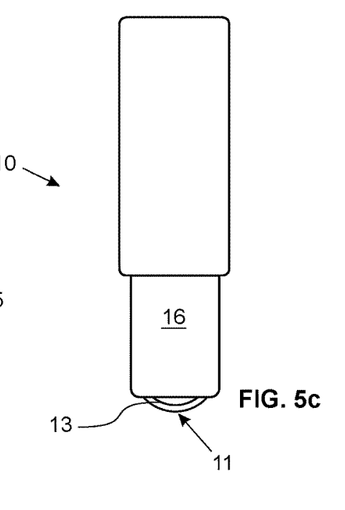

FIG. 5a and FIG. 5b depict two schematic side views of a tool according to the invention that can be used to detect a void such as depicted in FIG. 3 and FIG. 4. The tool has a tool tip 11 and a tool base 12 in the form of a handle to be gripped by a user. The handle will preferably be of metal such as aluminum or steel or of hard plastic. It is apparent from FIG. 5a and FIG. 5b that the tool tip 11 is formed by a member being able to rotate in relation to the tool base 12. The rotating member in FIG. 5a and FIG. 5b forming the tool tip 11 is—as an example—formed by the outer steel rim 13 of a roller bearing 14 supported in relation to the tool base 12 by a fork 15 defining and accommodating the axis A around which the tool tip 11 may rotate. The fork 15 is also forms part of the tool base. Due to this design the tool lacks any dampening elements and is extremely stiff in all directions any forces might act on the tool so that the tool gives "unfiltered" feedback to the tool base of the surfaces it is rolled on. FIG. 5c is a schematic side view of a further example of a tool 10 that can be used to detect a void such as depicted in FIG. 3 and FIG. 4. The tool has a tool tip 11 and a tool base 12 in the form of a handle to be gripped by a user. The handle will preferably be of a rigid material for example a metal such as aluminum or steel, or of hard plastic. It is apparent from FIG. 5c that the tool tip 11 is formed by a member being able to rotate in relation to the tool base 12. The rotating member in FIG. 5c forming the tool tip 11 is—as an example—formed by the ball of a ball transfer unit in relation to the tool base 12 by a socket 16 in which the tool tip 11 may rotate. The socket 16 also forms part of the tool base 12. Due to this design the tool lacks any dampening elements and is extremely stiff in all directions any forces might act on the tool so that the tool gives "unfiltered" feedback to the tool base of the surfaces it is rolled on.

Figure 6:
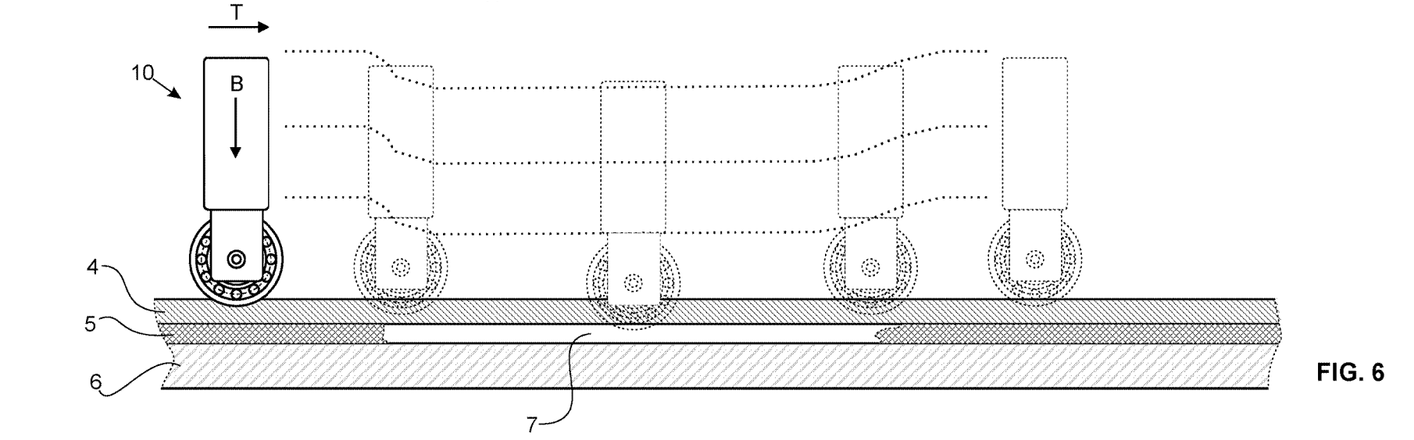
FIG. 6 is a schematic view of a defect detection tool being guided across a void underneath an outer protection layer.

FIG. 6 illustrates how the tool may be used when being guided over the surface of a protection layer 4 covering at least a section of the leading edge of a wind turbine generator blade in order to detect a defect underneath the protection layer. FIG. 6 shows the same cross-sectional view that is shown in FIG. 4. It is observed at the leftmost tool 10 that when biasing the tool in the biasing direction B will lead to deformation of the outer protective layer 4 also when there is no void under the outer protection layer 4. However, by following the path of the tool along the tool movement direction T it can be seen that once the tool reaches the area underneath which the void 7 is present, the tool will to at least some extent sink into the void 7 when entering it area and rise out of the void when leaving the area of the void since the bonding layer is not present and hence the relatively flexible outer protection layer does not support the tip 4 so the protective layer will deform toward the structural material layer 6 of the blade. This is indicated with a tool in dotted lines for various positions in the direction T with the resulting height indicated relative to the original unbiased height of the outer protection layer. It is observed that particularly the edges of the void are clearly indicated by steps in the response. Surprisingly, even voids in relatively thin bonding layers of for example 0.5-2 mm adhesive may be clearly sensed using the tool and method according to the invention.

It has been found that a tool designed with high stiffness in tool biasing direction B (ensured by the stiff tool base and tool tip support), low resistance in tool movement direction T (provided by the tool tip being rotatably supported in relation to the tool base to ensure no relative movement between the outer protection layer 6 and the tool tip 11 in the test spot) and capability of exerting a high local pressure on the surface of the protective layer (made possible by providing the tool with a tool tip forming only a small contact area with the surface it is in contact with and against which it is biased) gives very direct and unfiltered feedback about any irregularity and/or unevenness lying underneath the protection layer even if this layer is several millimeters thick and even is some but not enough bonding layer is present at the void. The user rolling the tool 10 along the path as shown in FIG. 6 will easily feel the void beginning and end of the void underneath the protective layer and is therefore put into a position to identify a potential void which cannot be seen by eye or felt by hand.

Figure 7:
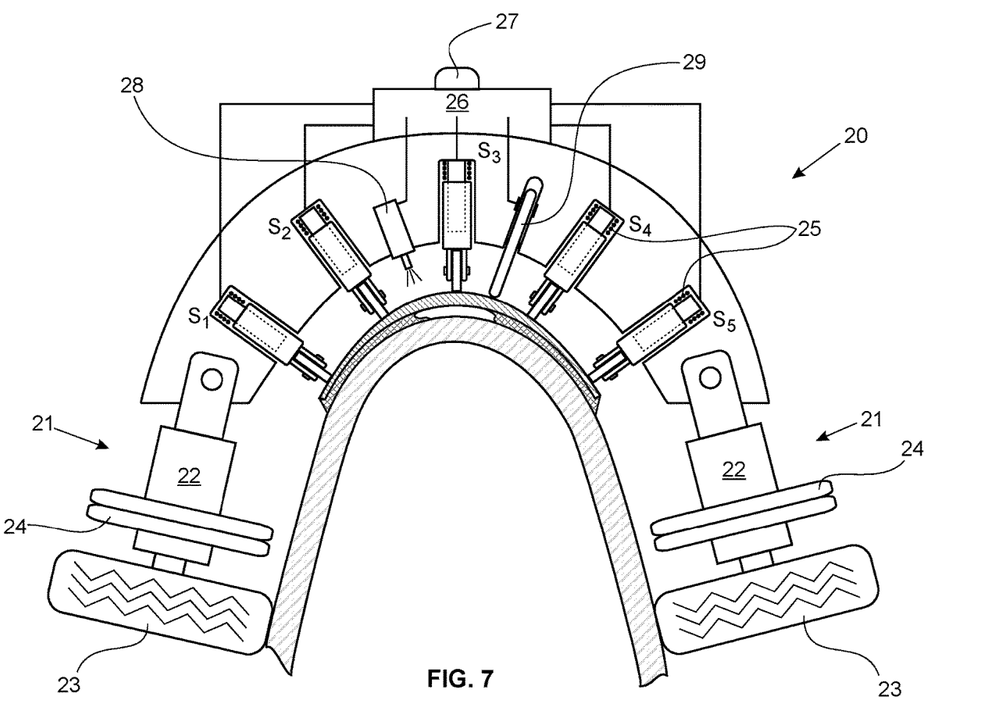
FIG. 7 depicts a defect detection unit being equipped with a plurality of sensors making use of a defect detection tools, and FIG. 8 schematically illustrates sensor data retrieved by using the defect detection unit shown in FIG. 7.

FIG. 7 shows a schematic view of a possible design of a defect detection unit 20 having a plurality of sensors $S_1$, $S_2$, $S_3$, $S_4$ and $S_5$. A tool as described above forms part of the sensor or, in other words, the sensors comprise a tool as described above with the tool tip acting as a sensor tip. The detection unit may be moved along the leading edge of the wind turbine generator blade 2 either by manually pulling or pushing the unit or by drive means 21. The drive means may comprise an electric motor 22 on either side of the unit which drives friction wheels 23 biased against and in contact with the surface of the blade 2, preferably biased against and in contact with a surface section of the blade that is not covered by the protection layer 4 for which the defect detection process is being performed. In order to allow the drive means to adapt to a changing cross section of the blade along the tool movement path in longitudinal direction of the blade the drive means 21 can be pivotably supported for example in relation to a frame or housing of the detection unit 20. The frame or housing forms a sensing unit accommodating the sensors $S_1$-$S_5$. Also, to increase the weight of the detection unit and to thereby increase the force biasing the tool tips 11 against the surface of the protection layer 4 and to enhance the movement stability of the detection unit external weights 24 may be used.

The detection unit 20 depicted in FIG. 7 has a housing or frame accommodating the sensors $S_1$, $S_2$, $S_3$, $S_4$ and $S_5$. These sensors comprise a tool with a tool tip 11 and tool base 12 as described above. Since these sensors are not manually guided the sensors are designed to sense a feedback value the sensor experiences while the tool tip is rolling on the surface of the protection layer during a movement of the tool tip 11 in tool biasing direction which, for each sensor, is substantially perpendicular to the surface of the protection layer 4 at the respective contact area where the tool tip contacts the surface of the protection layer. It follows from this that the rotatably supported tool tips of the plurality of tools and sensors act as wheels on which the detection unit is moving along the leading edge of the blade.

FIG. 7 also shows that the sensors comprising the tools are spring biased against the surface of the protection layer 4 by coil springs 25 it should be noted that other means for biasing the tool tips against the surface may of course also be used.

The detection unit 20 comprises a data analyzing and electronic storage or memory unit 26 to which the sensors are connected and which will record and store the data obtained by the sensors. The detection unit may also comprise an acoustic and/or optical signaling unit 27 to signal to the user when a potential defect such as a void is sensed. Furthermore, a marking unit 28 is shown which serves to leave a paint mark on the surface of the protection layer 4 in case a potential defect is detected by one of the sensors. Finally, FIG. 7 depicts the use of a control wheel 29 of a known diameter which will help to put into relation the feedback values sensed by the sensors with the distance the detection unit was moved from a starting point at the moment of the occurrence of a sensed sensor value indicating a potential defect.

It should be noted that although FIG. 7 only shows an embodiment with all sensors being positioned in the same plane substantially perpendicular to the longitudinal direction of the blade's edge an embodiment in which sensors are offset to each other in longitudinal direction is also possible, particularly stabilize the detection unit by counteracting a potential inclination of the detection unit around the horizontal transverse axis. The rotatably supported tool tips of such an embodiment may form front wheels and back wheels.

Figure 8:
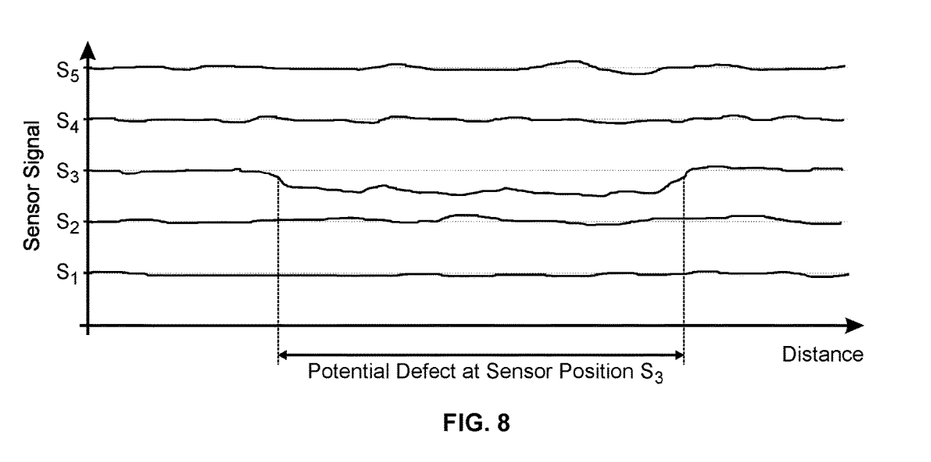

FIG. 8 shows a graph of the sensor data obtained by sensors $S_1$-$S_5$ while guiding a detection unit 20 of FIG. 7 along the leading edge of the blade 2. It can be seen that while the sensor value recorded from sensors $S_1$, $S_2$, $S_4$ and $S_5$ is rather consistent and does not deviate much from a center line over the distance the sensor value recorded from sensor $S_3$ shows a clear deviation from the center line over a certain distance and therefore indicates a potential defect at sensor position $S_3$. Together with data obtained from the control wheel and a known starting point the user my easily find the area where the potential defect can be found even in case the detection unit is not equipped with a marking unit or a signaling unit as described above.

While the present invention has been illustrated by the description of one or more embodiments thereof, and while the one or more embodiments have been described in considerable detail, it is not intended to restrict or in any way limit the scope of the appended claims to such detail. The various features discussed herein may be used alone or in any combination. Additional advantages and modifications will readily appear to those skilled in the art. The invention in its broader aspects is therefore not limited to the specific detail and illustrative examples shown and described. Accordingly, departures may be made from such details without departing from the scope of the general inventive concept.

LIST FOR REFERENCE NUMERALS

1 Horizontal axis wind turbine
2 Wind turbine generator blades
3 Leading edge
4 Outer protection layer/outer protection layer profile
5 Bonding layer
6 Structural material layer
7 Void (defect)
10 Defect detection tool
11 Tool tip
12 Tool base
13 Outer rim
14 Roller bearing
15 Fork
16 Socket
20 Defect detection unit
21 Drive means
22 Electric motor
23 Friction wheels
24 External weights
25 Coil springs
26 Storing unit
27 Signaling unit
28 Marking device
29 Control wheel
A Axis of rotation of tool tip
T Tool movement direction
B Tool biasing direction
$S_{1-5}$ Sensors

The invention claimed is:

1. A method for detecting defects underneath an outer protection layer protecting a leading edge of a wind turbine generator blade, the method, comprising:
    guiding a defect detection tool over the outer protection layer in a tool movement direction, and
    sensing at least one feedback value the defect detection tool experiences while being guided over the outer protection layer in order to detect a potential defect,
    wherein the defect detection tool comprises a tool base and a tool tip that is biased against a surface of the outer protection layer in a tool biasing direction while the defect detection tool is guided over the outer protection layer in the tool movement direction, and wherein the tool tip is arranged to detect potential defects underneath the outer protection layer as deviations in a uniformity of the at least one feedback value, and
    wherein the tool tip is formed by a disc, a rim, or a ball rotatably supported in relation to the tool base such that when the defect detection tool is being guided over the outer protection layer in the tool movement direction and the tool tip is biased in the tool biasing direction against the surface of the outer protection layer, the tool tip rolls on the surface of the outer protection layer.

2. The method according to claim 1, wherein the defect detection tool is hand-held and guided by a user and the at least one feedback value is sensed by the user.

3. The method according to claim 1, wherein the defect detection tool is part of a detection unit that is moved along the leading edge of the wind turbine generator blade, the detection unit comprising a feedback value sensing unit which is sensing the deviations in the uniformity of the at least one feedback value with at least one sensor, the sensor preferably being one of a displacement measuring sensor and a pressure measuring sensor and a force measuring sensor.

4. The method according to claim 3, wherein the detection unit is moved along the leading edge of the wind turbine generator blade and
    coordinates of a detected potential defect are stored in a storing unit and/or
    a detected potential defect is marked on the wind turbine generator blade by a defect marking device, and/or
    a detected potential defect is signaled to a user by a signal unit.

5. The method according to claim 3, wherein the detection unit is positioned on the wind turbine generator blade leading edge with the tool tip being biased against the surface of the outer protection layer by a weight of the detection unit.

6. The method according to claim 1, wherein the tool tip is spring-biased against the surface of the outer protection layer in the tool biasing direction.

7. A defect detection tool for detecting defects underneath an outer protection layer protecting a leading edge of a wind turbine generator blade, the defect detection tool comprising a tool base and a tool tip, the tool tip being designed to be guided across a surface of the outer protection layer in a tool movement direction and to be biased against the surface of the outer protection layer in a tool biasing direction in order to sense at least one feedback value the tool tip experiences in tool movement direction and/or in the tool biasing direction while being guided over the outer protection layer, wherein the tool tip is formed by a rim, a disc, or a ball rotatably supported in relation to the tool base.

8. The defect detection tool according to claim 7, wherein the tool base comprises a handle to be held by the hand of a user.

9. The defect detection tool according to claim 7, wherein, the tool base forms part of and/or is connected to a sensing section that is part of a sensing unit sensing deviation in a uniformity of the at least one feedback value with at least one sensor, the at least one sensor preferably being one of a displacement measuring sensor and a pressure measuring sensor and a force measuring sensor.

10. The defect detection tool according to claim 7, wherein, the rim or disc forming the tool tip is supported in relation to the tool base by rolling elements arranged between the tool tip and the tool base.

11. The defect detection tool according to claim 7, wherein that the tool tip is an outer rim of a roller bearing.

12. The defect detection tool according to claim 7, wherein the tool tip is the ball of a ball transfer unit.

13. The defect detection tool according to claim 8, wherein a width of the tool tip perpendicular to the tool movement direction is less than 10 mm, and/or in that an outer diameter of the rim or disc forming the tool tip is less than 25 mm.

14. The defect detection tool according to claim 8, wherein in the tool biasing direction the tool tip is rigidly supported in relation to the tool base.

15. The defect detection tool according to claim 7, wherein the tool tip is biased against the surface of the outer protection layer in the tool biasing direction by springs.

16. A defect detection tool for detecting defects underneath an outer protection layer protecting a leading edge of a wind turbine generator blade, the defect detection tool comprising a tool base and a tool tip, the tool tip being designed to be guided across a surface of the outer protection layer in a tool movement direction and to be biased against the surface of the outer protection layer in a tool biasing direction in order to sense at least one feedback value the tool tip experiences in tool movement direction and/or in tool biasing direction while being guided over the outer protection layer, wherein:
   the tool tip is formed by one of:
      a rim supported in relation to the tool base by rolling elements arranged between the tool tip and the tool base;
      a disc supported in relation to the tool base by rolling elements arranged between the tool tip and the tool base; or
      a ball rotatably supported in relation to the tool base;
   the tool base forms part of and/or is connected to a sensing section that is part of a sensing unit sensing deviation in a uniformity of the at least one feedback value with at least one sensor, the at least one sensor preferably being one of a displacement measuring sensor and a pressure measuring sensor and a force measuring sensor.

17. The defect detection tool according to claim 16, wherein the tool tip is biased against the surface of the outer protection layer in the tool biasing direction by springs.

* * * * *